US00RE43856E

(19) United States
(12) Reissued Patent
Berkowitz et al.

(10) Patent Number: US RE43,856 E
(45) Date of Reissued Patent: Dec. 11, 2012

(54) HYBRID PUBLIC/PRIVATE WIRELESS NETWORK WITH SEAMLESS ROAMING

(75) Inventors: Paul Berkowitz, Little Silver, NJ (US); Chauncey Shey, Shanghai (CN); Jan Vancraeynest, Pound Ridge, NY (US); Jose Vasconcellos, Lincroft, NJ (US)

(73) Assignee: Tasom Mobile Transfer Co. LLC, Wilmington, DE (US)

(21) Appl. No.: 12/291,334

(22) Filed: Nov. 7, 2008
(Under 37 CFR 1.47)

Related U.S. Patent Documents

Reissue of:
(64) Patent No.: 7,133,678
Issued: Nov. 7, 2006
Appl. No.: 10/095,209
Filed: Mar. 8, 2002

U.S. Applications:
(63) Continuation-in-part of application No. 09/328,306, filed on Jun. 8, 1999, now Pat. No. 6,868,272.

(51) Int. Cl.
*H04W 40/00* (2009.01)

(52) U.S. Cl. ..... 455/445; 455/406; 455/418; 455/422.1; 455/432.1; 455/432.2; 455/433; 455/435.1; 455/435.2; 455/436; 455/551; 455/552.1; 370/310; 370/310.2; 370/328; 370/331; 370/332; 370/333; 370/334; 379/201.02

(58) Field of Classification Search ..... 455/418, 455/422.1, 432.1, 432.2, 432.3, 433, 435.1, 455/435.2, 436, 445, 406, 551, 552.1; 370/310, 370/310.2, 328, 331–334; 379/201.02
See application file for complete search history.

(56) References Cited

U.S. PATENT DOCUMENTS 4,670,905 A 6/1987 Sandvos et al.
4,833,701 A 5/1989 Comroe et al.
(Continued)

FOREIGN PATENT DOCUMENTS

WO 96/35309 11/1996
(Continued)

OTHER PUBLICATIONS

Newton's Telecom Dictionary, 15th Edition, Feb. 1999, pp. 272, 762, 763.

(Continued)

*Primary Examiner* — Steve D Agosta

(57) ABSTRACT

A communications system connecting mobile subscriber devices to at least one of a PSTN and a plurality of PBX networks comprising a plurality of network interface units coupled to one of a PSTN and a PBX network, each of the plurality of network interface units having a predetermined coverage area; at least one mobile subscriber device, the mobile subscriber device assigned to one network interface unit considered a home network interface unit, and the mobile subscriber device receives a port assignment through the home network interface unit from one of the PSTN and the PBX network coupled to the home network interface unit, the PSTN port assignment determining the mobile subscriber device directory number, and the PBX network port assignment determining the mobile subscriber device extension number; a wireless access unit coupled to each of the plurality of network interface units and providing wireless connection between the network interface unit and a mobile subscriber device within the coverage area of the network interface unit; and a programmable cross-connect device connecting the plurality of network interface units and dynamically cross connecting calls between the home network interface unit of the mobile subscriber device and a visited network interface unit as part of call origination and termination process, the visited network interface unit covering a geographic region within which the mobile subscriber device is roaming.

108 Claims, 8 Drawing Sheets

U.S. PATENT DOCUMENTS

| | | | | | |
|---|---|---|---|---|---|
| 4,879,740 | A | | 11/1989 | Nagashima et al. | |
| 5,127,042 | A | | 6/1992 | Gillig et al. | |
| 5,210,787 | A | * | 5/1993 | Hayes et al. | 455/435.1 |
| 5,345,498 | A | | 9/1994 | Mauger | |
| 5,353,340 | A | | 10/1994 | Kunz | |
| 5,434,854 | A | | 7/1995 | Focarile et al. | |
| 5,497,412 | A | | 3/1996 | Lannen et al. | |
| 5,526,400 | A | | 6/1996 | Nguyen | |
| 5,530,693 | A | * | 6/1996 | Averbuch et al. | 370/331 |
| 5,594,740 | A | | 1/1997 | Ladue | |
| 5,594,777 | A | | 1/1997 | Makkonen et al. | |
| 5,629,974 | A | | 5/1997 | Rajala et al. | |
| 5,659,544 | A | | 8/1997 | La Porta et al. | |
| 5,666,107 | A | | 9/1997 | Lockhart et al. | |
| 5,724,658 | A | | 3/1998 | Hasan | |
| 5,734,979 | A | * | 3/1998 | Lu et al. | 455/445 |
| 5,825,759 | A | * | 10/1998 | Liu | 370/331 |
| 5,832,382 | A | | 11/1998 | Alperovich | |
| 5,862,481 | A | | 1/1999 | Kulkami et al. | |
| 5,873,042 | A | * | 2/1999 | Vo | 455/458 |
| 5,905,952 | A | * | 5/1999 | Joensuu et al. | 455/433 |
| 5,907,808 | A | * | 5/1999 | Vaara et al. | 455/441 |
| 5,978,678 | A | | 11/1999 | Houde et al. | |
| 6,064,885 | A | * | 5/2000 | Rouhollahzadeh et al. | 455/439 |
| 6,104,915 | A | | 8/2000 | Zhang et al. | |
| 6,229,792 | B1 | * | 5/2001 | Anderson et al. | 370/280 |
| 6,385,454 | B1 | | 5/2002 | Bahl et al. | |
| 6,868,272 | B1 | | 3/2005 | Berkowitz et al. | |
| 7,133,678 | B1 | | 11/2006 | Berkowitz et al. | |

FOREIGN PATENT DOCUMENTS

| | | |
|---|---|---|
| WO | 97/04611 | 2/1997 |
| WO | 98/23123 | 5/1998 |
| WO | 98/56198 | 12/1998 |
| WO | 00/76250 | 12/2000 |
| WO | 00/28772 | 9/2009 |

OTHER PUBLICATIONS

International Preliminary Examination Report, PCT International Application No. PCT/US00/15593, dated Oct. 8, 2001.

International Search Report, PCT International Application No. PCT/US00/15593, dated Oct. 2, 2000.

US 5,282,240, 01/1994, Buhl et al. (withdrawn)

* cited by examiner

HYBRID PUBLIC/PRIVATE WIRELESS NETWORK WITH SEAMLESS ROAMING

Matter enclosed in heavy brackets [ ] appears in the original patent but forms no part of this reissue specification; matter printed in italics indicates the additions made by reissue.

RELATED APPLICATIONS

The present application is *a reissue of U.S. patent application Ser. No. 10/095,209* (*now U.S. Pat. No. 7,133,678*), *filed Mar. 8, 2002, which is* a continuation in part of [the patent application entitled "METHOD AND APPARATUS FOR ROAMING IN HIERARCHICAL MOBILE COMMUNICATION NETWORK" Ser. No. 09/328,306] *U.S. patent application Ser. No. 09/328,306* (*now U.S. Pat. No. 6,868,272*, filed on Jun. 8, 1999 [now U.S. Pat. No. 6,868,272 B1, having a common inventor, Mr. Jan Vancraeynest,] and herein incorporated by reference.

BRIEF DESCRIPTION OF THE INVENTION

1. Field of the Invention

This invention relates generally to communications systems having mobile subscribers and, more particularly to wireless private branch exchange systems used together with public mobile communication systems.

2. Background of the Invention

Business customers of wireless networks have often expressed a desire for a single phone number to reach them in their office as well as in public. Some prior art systems have been able to provide limited indoor/outdoor mobility for wireless users, but they are for the most part unable to provide seamless roaming between public and private telecommunication networks. In particular, indoor cellular systems in the prior art can either be part of private system, such as a wireless Private Branch Exchange (PBX) or they can be extensions of the public network (PSTN) to an indoor space. The former case is exemplified by U.S. Pat. No. 4,879,740 (Nagashima et al.) and U.S. Pat. No. 5,127,042 (Gillig et al.); the latter approach is described in U.S. Pat. No. 5,594,740 (Makkonen et al.). In the case of the PBX approach, a wireless phone is treated as a PBX extension while in a building but is not able to "hand over" seamlessly to the public cellular network if the user leaves the coverage domain of the private system. Additionally, the mobile phone has two different phone numbers, one for internal use and a different number for outside use. When making or receiving calls, the phone operates based on the switch to which it is connected at the moment (PBX or Public) and does not route calls back to its "home" switch, possibly necessitating different dialing procedures for accessing the same service from indoor venues or outdoor venues. Different radio technologies used in the private and public wireless network make such a dual-use phone more expensive and more battery power-hungry than either a private or public cellular phone considered separately.

The alternate approach in the prior art for seamless in and out of building mobility involves extending the public cellular network indoors. In this case, the user continues to be treated as if in the public space but the call uses private infrastructure when indoors. In this case, the users' phone number and switch features and extension dialing are determined by the public cellular system and the carrier's switch, not the user's PBX (which may indeed be purely virtual). This requires the user to adopt different dialing procedures for his wireless phone than he would use for his PBX. Moreover, any wired phone connected to a user's PBX would not be linked to the user's wireless phone.

It is therefore desirable to provide a solution that without changes to PBX or public network and using a single handset permits:

1. Private wireless subscribers to access the public wireless network when outside the coverage of their private system, including when inside the coverage of another private system, while maintaining dialing procedures and numbering plans (such as extension dialing) from their own private wireless system;
2. Public wireless subscribers to access the public wireless network through the locally installed private wireless infrastructure which usually provides better indoor coverage than the public wireless network;
3. Private network operators/owners to be compensated by public network operators or other private network operators for the use of their private infrastructure by subscribers belonging to other networks;
4. Subscribers of a private system to simultaneously have their wired phone, connected to their PBX, as well as their wireless phone, anywhere on the public wireless network, ring simultaneously and provide identical features as if in the office;
5. Seamless handover for all users between indoor and outdoor, otherwise independent systems;
6. Guaranteeing a minimum capacity for users registered on a private PBX, while providing the benefits of] and 2 to users registered on the public system or on other private PBXs.
7. Tying together physically disjoint PBX into one large logical virtual PBX without the need for physical connections between the elemental PBXs;
8. Maximum isolation and independence of traffic and capacity changes within each network from traffic and capacity changes between networks.

SUMMARY OF THE INVENTION

Each network interface unit in the partition consists of a plurality of Network Interface Units (NIU) connected between a wireless access subsystem (WAS) and the network's air Traffic Controller (ATC). Each NIU may also be connected to a local exchange switch or to a PBX. Each subscriber of the local exchange (LE) or any PBX is assigned a single home NIU connected to the subscriber's assigned port on the local exchange or the PBX, respectively. The ATC registers when subscribers move outside the coverage area of their Home NIU. When a subscriber wants to make a call from the coverage area of a NIU different from his or her Home NIU, the A TC routes the call to the Home NIU which sets up the call to the subscriber's assigned port on the PBX or LE. Similarly, the ATC routes the incoming calls arriving at the Home NIU from the subscriber's assigned port on the PBX or LE to the Visited NIU where the subscriber can be reached. The connection is always through the switch port assigned to the subscriber A making roaming entirely transparent to the switch (local exchange or PBX) and switch billing systems. The ATC acts as a combination visited location register/home location register (VLR/HLR) and crossconnect switch between Visited NIU and Home NIU.

Briefly, one aspect of the present invention is embodied in a communications system connecting mobile subscriber devices to at least one of a PSTN and a plurality of PBX networks comprising a plurality of network interface units coupled to one of a PSTN and a PBX network. Each of the plurality of network interface units have a predetermined coverage area in which a plurality of mobile subscriber devices roam. Each mobile subscriber device is assigned to one network interface unit designated a home network interface unit, and the mobile subscriber device receives a port assignment through the home network interface unit from one of the PSTN and the PBX coupled to the home network interface unit. The PSTN port assignment determines the mobile subscriber device directory number, and the PBX network port assignment determines the mobile subscriber device extension number. A wireless access unit is coupled to each of the plurality of network interface units and provides wireless connection between the network interface unit and a mobile subscriber device within the coverage area of the network interface unit. A programmable cross-connect device connects the plurality of network interface units and dynamically cross-connects calls between the home network interface unit of the mobile subscriber device and a visited network interface unit as part of call origination and termination process. The visited network interface unit covers a geographic region within which the mobile subscriber device is roaming.

Another embodiment of the present invention teaches a method of providing communication services for a plurality of mobile subscriber devices and at least one of a PSTN and one of a plurality of PBX networks comprising, coupling a plurality of network interface units to one of a PSTN and a PBX network, wherein each of the plurality of network interface units have a predetermined coverage area. Each of the mobile subscriber devices are assigned to only one of the plurality of network interface units considered a home network interface unit, and each of the mobile subscriber devices receive a port assignment through the home network interface unit from one of the PSTN and the PBX network coupled to the home network interface unit, wherein a wireless access unit coupled to each of the plurality of network interface units and providing wireless connection between the network interface unit and a mobile subscriber device within the coverage area of the network interface unit; and connecting a programmable cross-connect device to the plurality of network interface units and dynamically cross connecting calls between the home network interface unit of the mobile subscriber device and a visited network interface unit as part of call origination and termination process, the visited network interface unit covering a geographic region within which the mobile subscriber device is roaming.

DETAILED DESCRIPTION OF THE INVENTION

The present invention is directed to a communication system comprising a partition of multiple sub-networks (each under the coverage of a network interface unit) providing mobility to subscriber devices roaming within and across these sub-networks. Each sub-network may be connected to a Private Branch Exchange or the Public Switched Telephone Network without requiring any changes to either the PBX or PSTN, and with the PBX or PSTN port assigned to a subscriber device determining the subscriber directory number and/or extension number as well as other subscriber specific features available only through the subscribers home PSTN or PBX system. The sub-network connected to the PBX or PSTN port corresponding to the subscriber's directory number is the subscriber's home sub-network. A programmable cross connect device provides full connectivity between all constituent sub-networks and dynamically cross connects calls between Home sub-network and Visited sub-network as part of the call origination and termination process, hence preserving all features available to a subscriber device within its home sub-network while the subscriber is roaming into another sub-network.

Figure 1:
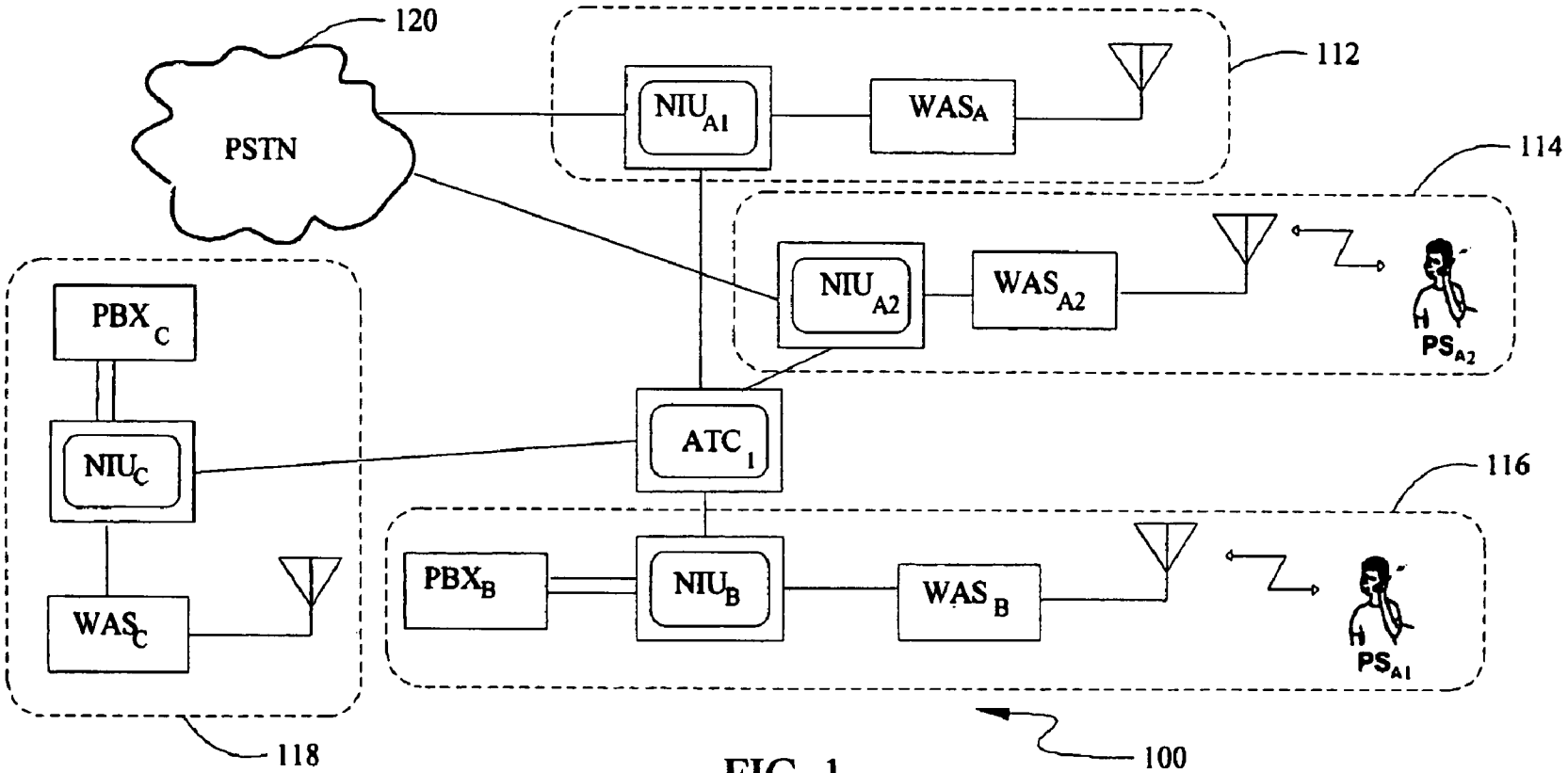
FIG. 1 is a block diagram showing a hybrid public/private wireless network according to the teachings of the present invention.

FIG. 1 is a block diagram showing a hybrid public/private wireless network 100 according to one embodiment of the present invention. The hybrid public/private wireless network 100 consists of a plurality of network interface units (NIU) (also referred to as sub-networks) such as $NIU_{A1}$, $NIU_{A2}$, $NIU_B$ and $NIU_C$. Each NIU is coupled to either a PSTN network or a private branch exchange network (PBX). For example, as shown in FIG. 1, the $NIU_{A1}$ and $NIU_{A2}$ are coupled to the public switching network, PSTN 120. Other NIU devices, such as $NIU_B$ and $NIU_C$ are coupled to the two private branch exchange networks $PBX_B$ and $PBX_C$ respectively. Throughout this document, the terms sub-networks interface and sub-network interface units will be used interchangeably.

Each NIU device is also coupled to a Wireless Access sub-system (WAS), also referred to as wireless access unit, allowing the NIU to communicate with a plurality of visiting or resident subscribers within its coverage region. A programmable cross connect device, referred to as an Air Traffic Controller ($ATC_1$), couples the plurality of NIU devices within a given region to each other. Within a plurality of regions, a multitude of mobile device subscribers may are moving within and in between the various regions each under the coverage of a particular NIU. However, each mobile subscriber is assigned to and registered with one and only one NIU, which would be coupled to the mobile subscriber's home PBX or PSTN. The NIU to which a particular mobile subscriber is assigned to is that subscriber's home NIU.

Each network interface unit (NIU) serves a different geographic region limited by the range of transmission and reception of its corresponding wireless access subsystem (WAS) to which that NIU is coupled. The coverage area corresponding to each NIU is shown in FIG. 1. The shaded area 112 represents the coverage area of $NIU_{A1}$. Similarly, area 114 represents to the coverage area under $NIU_{A2}$, 116 represents to the coverage area of $NIU_B$, and area 118 represents the coverage area under $NIU_C$. In one embodiment, an interface device may be implemented as a computer with controllers. Each NIU may include an interface board for interfacing with the WAS. In this embodiment, the interfacing may take place over an E1 link. E1 is a European digital transmission format and is well known to those skilled in the art.

The interface between the NIU and a PSTN or PBX network may take place over an analog interface, a T1 interface or other such interfaces. The interface devices are typically coupled to a class 5 switch in the PSTN. According to one embodiment of the invention, each interface is located in the respective region that it serves. According to another embodiment of the invention, the interfaces may be located in regions other than in the respective regions they serve. For example, the interfaces may be co-located.

As shown in FIG. 1, each NIU is also coupled to a WAS. For example, $NIU_{A1}$ is coupled to $WAS_{A1}$, $NIU_{A2}$ to $WAS_{A2}$, $NIU_B$ to $WAS_B$, and $NIU_C$ to $WAS_C$. A WAS may include radio port controllers coupled to radio transceivers. Radio transceivers are used to communicate with mobile subscribers. Each radio transceiver may include radio ports and appropriate transceiver circuitry.

Air traffic controllers couple the plurality of NIUs to each other. As shown in FIG. 1, the $ATC_1$ couples $NIU_{A1}$, $NIU_{A2}$, $NIU_B$, and $NIU_C$. An ATC such as $ATC_1$ shown in FIG. 1, may be implemented by dedicated circuits. In another embodiment, the ATC may be implemented by a computerized system and virtual circuits. The ATC circuitry may include bearer channels and control channels. The bearer circuitry provides a path for transmission of information, such as voice from a subscriber, to the correct NIU. The circuitry that routes between the interfaces (e.g., ATC) includes a cross connect, which is a switch that maps various incoming and outgoing lines. In one example, an ATC may have 30 multiplexed lines. The ATC circuitry may act as a controller and include an E1 interface. Typical bearer path for transmission of information may also occur over an E1 line.

An NIU may be capable of handling a large number of subscribers assigned to it. In one embodiment, up to 10,000 subscribers and a large number of roaming subscribers may be serviced by a single device. It would be apparent to one skilled in the art that the size and capacity of the NIUs, the ATC and sizing of the connection between the NIU devices and the ATC circuitry are dependent on the amount of roaming traffic over that particular NIU and the ATC, and the desired grade of service for such roaming traffic.

As shown in FIG. 1, the mobile subscriber $PS_{A2}$ is moving within the coverage area of the $NIU_{A2}$ which is its home interface. In contrast, the mobile subscriber $PS_{A1}$ is shown outside of the coverage area of its home interface, $NIU_{A1}$, and is roaming within the coverage area of a new interface device, $NIU_B$. Calls for and from $PS_{A1}$ would still be routed through its home network interface unit $NIU_{A1}$ coupled to its particular PSTN port within the public network PSTN 120. The routing of calls for $PS_{A1}$ would be further described in FIG. 2, and compared to the routing of non-roaming mobile subscriber $NIU_{A2}$.

Figure 2:
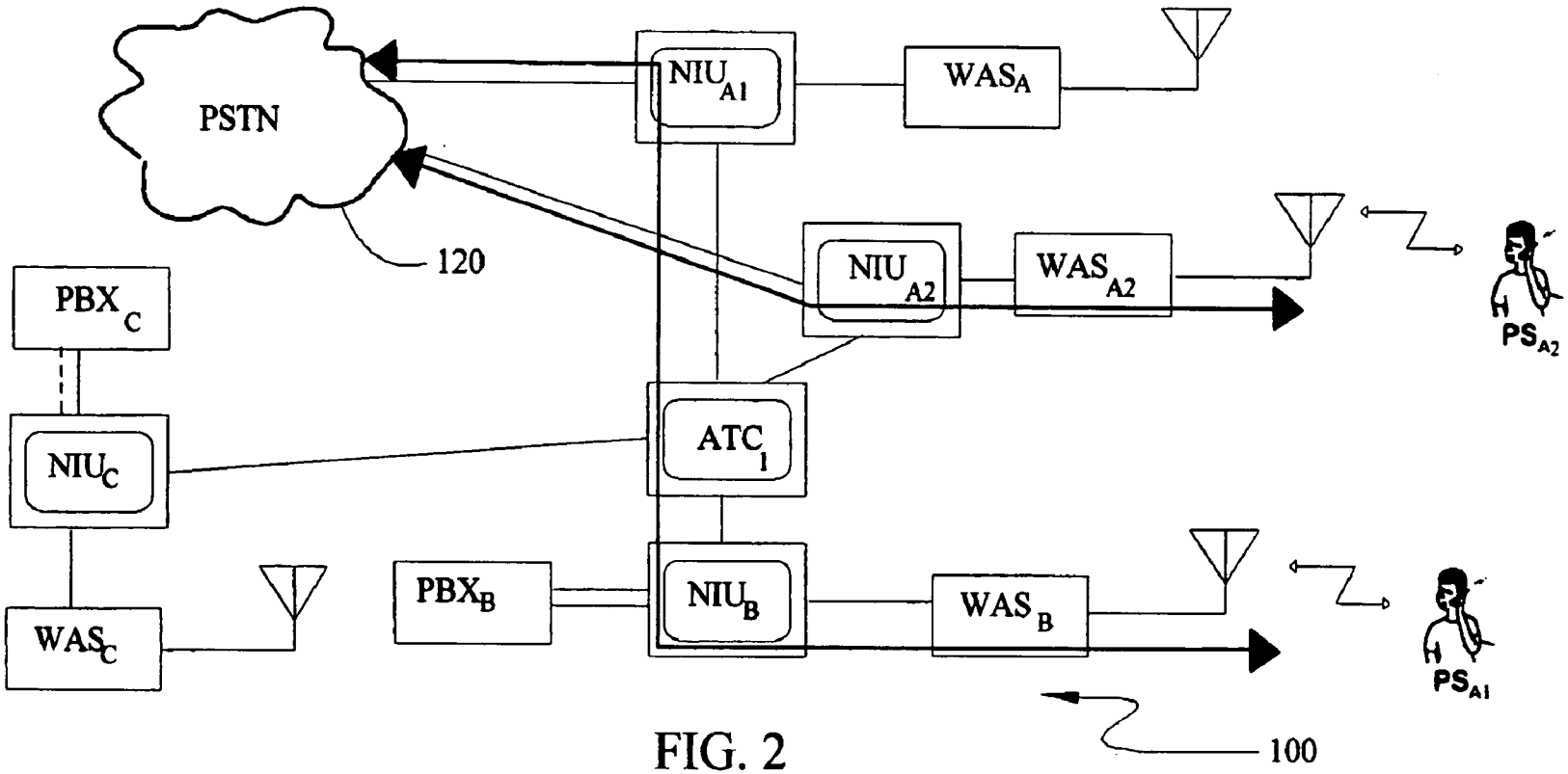
FIG. 2 illustrates how the ATC of FIG. 1 routes incoming and outgoing calls for subscribers roaming outside their home network where their home NIU acts as the interface for a PSTN.

FIG. 2 illustrates how the ATC routes incoming and outgoing calls for subscribers roaming outside their home network, where their home NIU acts as the interface for a Public-switched telephone network (PSTN).

In the example of FIG. 2, the mobile subscriber $PS_{A1}$ is shown to be roaming outside the coverage of its home NIU, $NIU_{A1}$. Each network interface unit NIU emits a unique paging identifier through its corresponding wireless access sub-system. As the mobile subscriber $PS_{A1}$ moves between the coverage area of various NIUs, it will notice the change in the paging identifier. The mobile subscriber $PS_{A1}$ in turn transmits its unique identification along with a registration request to the new NIU, $NIU_B$ in this example. Since $PS_{A1}$ is not assigned to $NIU_B$, the $NIU_B$ forwards the registration request to the $ATC_1$. If $ATC_1$ is aware of the mobile subscriber $PS_{A1}$, it updates its location register and forwards the registration request to $NIU_{A1}$ the mobile subscriber, $PS_{A1}$'s home NIU. If the $ATC_1$ does not recognize $PS_{A1}$, it sends the registration requests to all NIUs under its coverage such as $NIU_{A1}$, $NIU_{A2}$ and $NIU_C$ as shown here but not to $NIU_B$, the NIU originating the forwarded registration request. $NIU_{A1}$ as the home NIU to which $PS_{A1}$ is assigned would recognize the registration request and respond to it by sending an authentication request to the ATC who in turn forwards the response to $NIU_B$.

The home NIU, $NIU_{A1}$ in this example, will update its database to reflect the current location of $PS_{A1}$, and may attempt to forward incoming calls for $PS_{A1}$ directly to $NIU_B$, routed through $ATC_1$.

In an alternative embodiment, each mobile subscriber may be programmed with the identity of its home NIU. Thus, the current NIU may be able to direct registration requests directly to the subscribers home NIU without the need to query the $ATC_1$.

In another embodiment, the identity of the home NIU to which the mobile subscriber is assigned may be deduced from the mobile subscriber's unique identification number. For example, the mobile subscriber identification number may be coded so as to have a unique prefix corresponding to its home network.

When receiving an incoming call for $PS_{A1}$, its home NIU, $NIU_{A1}$ in this example, will send out a page corresponding to the mobile subscriber, $PS_{A1}$ in this example, via $WAS_{A1}$. $NIU_{A1}$ will also send the page to the $ATC_1$. Since the mobile subscriber $PS_{A1}$ is roaming outside the coverage area of $NIU_{A1}$, the wireless access sub-system $WAS_{A1}$ will not report a positive page acknowledgment. If $ATC_1$ knows about $PS_{A1}$, it will forward the page to the appropriate NIU under whose coverage $PS_{A1}$ is currently located, or was most recently known to be. Otherwise, $ATC_1$ will forward the page to all NIUs under its coverage except the NIU originating the page, $NIU_{A1}$ in this case. The NIU that currently has the $PS_{A1}$ under its coverage, $NIU_B$ in this example, will respond to the page. In response, $ATC_1$ will forward the page response to $PS_{A1}$'s home NIU, $NIU_{A1}$, and establish a call path between the home NIU, $NIU_{A1}$ and the visiting NIU, $NIU_{A2}$, through $ATC_1$ to the roaming subscriber $PS_{A1}$. Authentication and alerting will take place and the connection is established.

In an alternative embodiment, the home NIU may keep track of the location of the mobile subscriber, and thus may be able to forward the incoming call through the $ATC_1$, to the appropriate NIU ($NIU_B$ in this example), under whose coverage the mobile subscriber $PS_{A1}$ is located. Thus, the home NIU may be able to establish a connection with its roaming mobile subscriber without querying the $ATC_1$.

When originating a call from $PS_{A1}$ while under the coverage of an NIU other than its home NIU, $NIU_B$ in this example, the mobile subscriber $PS_{A1}$ will send a set-up message to $NIU_B$. Call handling will follow the same procedure as in the registration process and the mobile subscriber's telephone call will be established through the $ATC_1$ and the home NIU, $NIU_{A1}$ to the PSTN port.

In an alternative embodiment, the visited NIU, $NIU_B$ may be able to direct registration requests directly to the subscriber's home NIU without the need to query the $ATC_1$. The home NIU identification may be accomplished by deconstructing the unique mobile subscriber identification number and obtaining the part that will identify the home network. For example, the mobile subscriber identification number may have a unique prefix corresponding to the home NIU that particular device is assigned to. Alternatively, the identity of the home NIU may be programmed into the mobile subscriber device at the time of activation.

The mobile subscriber $PS_{A2}$ is located within the coverage area of its home NIU, $NIU_{A2}$ in this example. When a call comes in for the subscriber $PS_{A2}$ from a public network, $NIU_{A2}$ transmits a page through its corresponding $WAS_{A2}$. The page is received by $PS_{A2}$ because it is within the coverage area of $WAS_{A2}$ and $PS_{A2}$ responds to the page with an acknowledgment. Once the $NIU_{A2}$ receives the response from $PS_{A2}$, it establishes connection from the land line to the mobile wireless subscriber.

When $PS_{A2}$ originates a can, its home NIU, the call is still directed through $NIU_{A2}$ to the appropriate receiver, the PSTN in this example.

Figure 3:
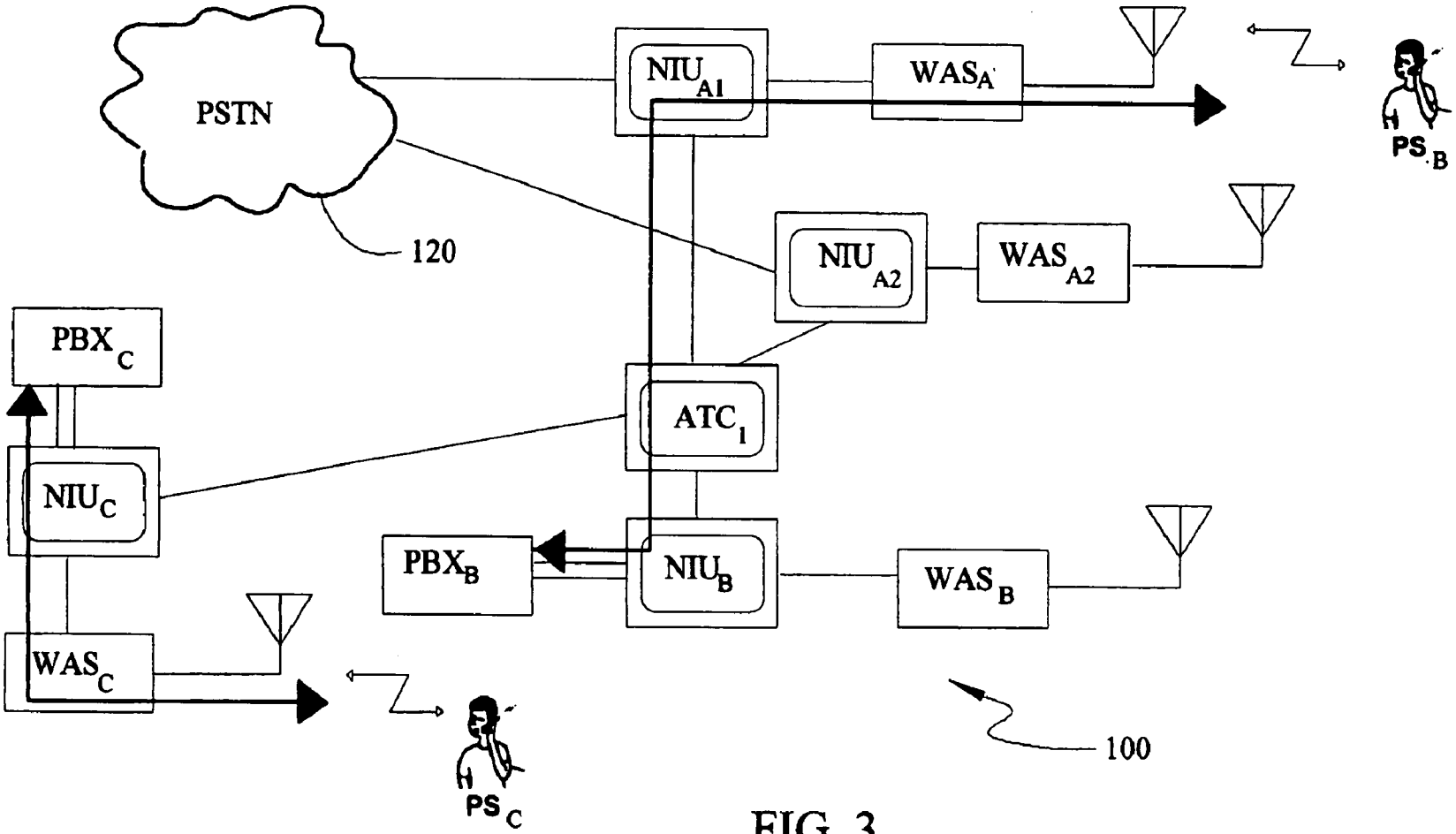
FIG. 3 illustrates how the ATC of FIG. 1 routes incoming and outgoing calls for subscribers roaming outside their home network where their home NIU acts as the interface for a PBX.

FIG. 3 illustrates the roaming and non-roaming originating and receiving a call for a subscriber whose home network is a PBX system.

FIG. 3 illustrates how the ATC routes incoming and outgoing calls for subscribers roaming outside their home network where their home NIU acts as the interface for a Private Branch Exchange network (PBX).

Network Interface units usually connect to a PBX over a 2-wire analog voice frequency interface that doesn't carry any clock information. In one embodiment, the NIUs obtain the network clock from their digital connection to the ATC. The ATC(s) derive their clock from the one or more NIUs connected to the PSTN over a digital signaling interface. Because all WASs are connected to the NIUs which are in turn connected to a PBX, the WASs can therefore through the ATC derive their clocks to be synchronous with the clock used by the PBX. The same applies to all WAS connected to NIU directly connected to the PSTN. Such synchronous operation of all WAS over the air interface is a necessary condition for permitting seamless handover in most digital wireless technologies.

Since the present invention realizes the aforementioned benefits while allowing the NIUs connected to a PBX to maintain their 2-wire analog voice frequency interface to the PBX, the PBX can connect each subscriber port to one or more wired telephones in addition to the NIU through one or more simple 2-wire bridge taps, well known to those skilled in the art. Such wired telephones will ring for incoming calls together with the subscriber's PS, wherever in the network the PS is roaming. The subscriber may answer such wired telephone(s) if he/she is at his/her desk and chooses to use the higher-quality wired connection over the wireless connection, or the traveling subscriber may instruct the subscriber's personal assistant to answer the wired telephone after a pre-agreed upon number of rings.

The process of registration, originating a call and terminating a call for a mobile subscriber roaming within and outside its home network, and connecting to a private branch exchange network (PBX), is similar to that described in FIG. 2, wherein the mobile subscriber is connected to a public switched telephone network (PSTN).

In the first example, the mobile subscriber $PS_C$ is within the coverage area of the $WAS_C$ coupled to its home NIU, $NIU_C$ which is coupled to the $PBX_C$. Both originating calls from $PS_C$ and incoming calls for $PS_C$ are routed through its home NIU, $NIU_C$.

In areas where the coverage areas of different sub-networks overlap (as may commonly be expected between a public outdoor wireless sub-network and a private indoor wireless sub-network), the mobile subscriber may choose which sub-network to preferentially access based on the mobile subscriber's mode of operation and a unique identification code (ID) periodically emitted by the WAS of each sub-network. In one embodiment of the present invention, public mobile subscribers are preprogrammed to preferentially access WAS that emit a predefined "public" code, and private mobile subscribers are preprogrammed to preferentially access WAS that emit a predefined "private" code as long as the signal quality from the preferentially selected WAS meets or exceeds certain minimum standards, even though the signal quality from the preferentially selected WAS may be inferior to the signal quality received from the other overlapping WAS which are not preferentially selected.

Since all calls enter or leave the mobile communications network through the Home NIU of a subscriber regardless of the location of the subscriber, each subscriber can also retain the dialing plan and switch/PBX-based features of his home network, while roaming throughout the coverage area of the whole network.

In another example, the mobile subscriber $PS_B$ is roaming outside the coverage area of its home network $NIU_B$. When receiving an incoming call for $PS_B$, $NIU_B$ will page the mobile subscriber, $PS_B$ through its $WAS_B$ as well as sending the page to the $ATC_1$. $NIU_B$ will also send the page to the $ATC_1$. Since the mobile subscriber $PS_B$ is roaming outside the coverage area of $NIU_B$, the wireless access sub-system $WAS_B$ will not report a positive page acknowledgment. If $ATC_1$ knows about $PS_B$, it will forward the page to the appropriate NIU under whose coverage $PS_B$ is currently located or was most recently known to be. Otherwise, $ATC_1$ will forward the page to all NIUs under its coverage except the NIU originating the page, $NIU_B$ in this case. The NIU that currently has the $PS_B$ under its coverage, $NIU_{A1}$ in this example, will respond to the page. In response, $ATC_1$ will forward the page response to $PS_B$'s home NIU, $NIU_B$, and establish a call path between the home NIU, $NIU_B$ and the visiting NIU, $NIU_{A1}$, through $ATC_1$ to the roaming subscriber $PS_B$. Authentication and alerting will take place and the connection is established.

When originating a call from $PS_B$ while under the coverage of an NIU other than its home NIU, $NIU_{A1}$ in this example, the mobile subscriber $PS_B$ will send a set-up message to $NIU_{A1}$. $NIU_{A1}$ will forward the set-up call through the $ATC_1$ to the appropriate home NIU, $NIU_B$ in this case. Call handling will follow the same procedure as in the registration process and the mobile subscriber's telephone call will be established through the $ATC_1$ and the home NIU, $NIU_{A1}$ to the PBX port. In one embodiment, the home NIU identification may be accomplished by deconstructing the unique mobile subscriber identification number and obtaining the part that would identify the home network. For example, the mobile subscriber identification number may have a unique prefix corresponding to the home NIU that particular device is assigned to. Alternatively, the identity of the home NIU may be programmed into the mobile subscriber device at the time of activation.

Figure 4:
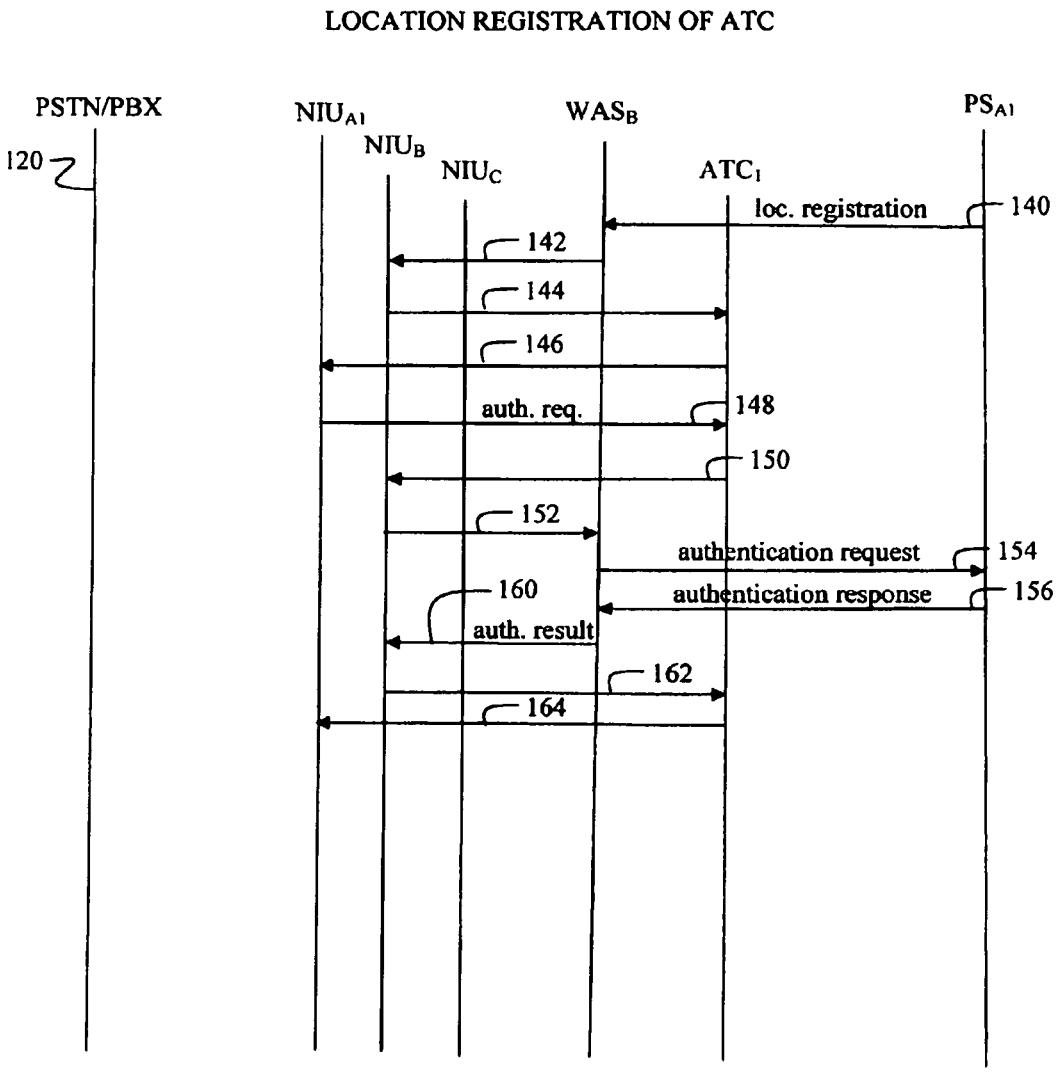
FIG. 4 is a connection diagram illustrating the mobile subscriber location registration process for a roaming subscriber, according to the present invention.

FIG. 4 is a connection diagram illustrating the mobile subscriber location registration process for a roaming mobile subscriber, according to one embodiment of the present invention. FIG. 4 has various lines representing communication with the following devices: PSTN 120, $NIU_{A1}$, $NIU_B$, $NIU_C$, $WAS_B$, $ATC_1$, and $PS_{A1}$. First, a registration message is received by the $WAS_B$. As shown here, location registration is sent from subscriber $PS_{A1}$ to $WAS_B$ coupled to the $NIU_B$ interface. In this case, subscriber $PS_{A1}$ is located in the coverage area of the $WAS_B$, which is not the home location of subscriber $PS_{A1}$. $WAS_B$ sends a message 142 to its respective interface device $NIU_B$. In this example, the location registration message 140 is the first communication the mobile subscriber $PS_{A1}$ has had with the $NIU_B$. The network interface device $NIU_B$ does not recognize subscriber $PS_{A1}$ and thus it sends a message 144 to the $ATC_1$. Assuming that $ATC_1$ has not yet stored $PS_{A1}$ in its database, then $ATC_1$ queries other interface devices including $NIU_{A1}$ (line 146) to determine the home location for subscriber $PS_{A1}$. No inquiry is sent to $NIU_B$ since the location registration request was forwarded by $NIU_B$. In this example, subscriber $PS_{A1}$ belongs to interface device $NIU_{A1}$. Thus, $NIU_{A1}$ responds (authorization request 148). $ATC_1$ forwards this response to the $NIU_B$ (line 150). $NIU_B$ forwards this authentication request to its corresponding $WAS_B$(line 152), which in turn transmits the authentication request 154 to the roaming mobile subscriber $PS_{A1}$. An authentication response 156 is sent back from the mobile subscriber $PS_{A1}$ to the $WAS_B$ who in turns forwards the authentication response to the $NIU_B$ (line 160). $NIU_B$ communicates this authentication response to the circuitry $ATC_1$ (line 162). The authorization response is then sent from circuitry $ATC_1$ back to interface device $NIU_{A1}$. $NIU_{A1}$ determines whether the subscriber $PS_{A1}$ should be authenticated, and can then make future determinations based on this authentication.

Figure 5:
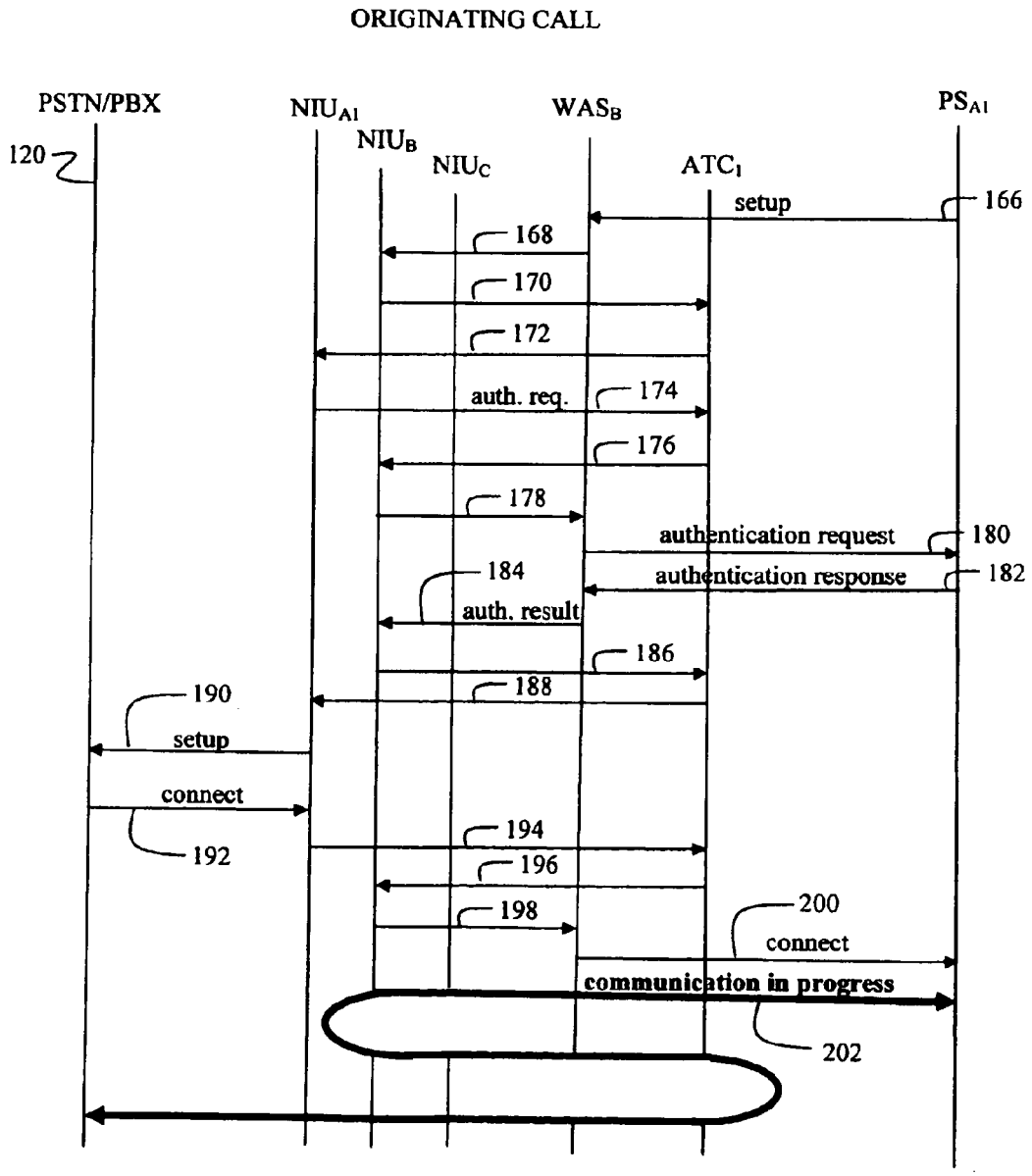
FIG. 5 is a connection diagram illustrating the a mobile subscriber call origination process according to the present invention.

FIG. 5 is a connection diagram illustrating the roaming mobile subscriber originating call process according to the teachings of the present invention. Here it is assumed that the mobile subscriber $PS_{A1}$ is already registered at the particular location and that the circuitry $ATC_1$ knows that subscriber $PS_{A1}$ belongs to interface device $NIU_{A1}$. The roaming mobile subscriber $PS_{A1}$ is located in the coverage area of interface device $NIU_B$. Thus, the subscriber $PS_{A1}$ sends a set-up request 166 to the $WAS_B$, under whose area of coverage it is currently located. This request is forwarded to interface device $NIU_B$ (line 168). $NIU_C$ signals circuitry $ATC_1$ (line 170). Since $ATC_1$ knows that subscriber $PS_{A1}$ is assigned to interface device $NIU_{A1}$, circuitry $ATC_1$ signals $NIU_{A1}$(line 172). $NIU_{A1}$ in turn makes an authorization request (line 174) to circuitry $ATC_1$. In response, circuitry $ATC_1$ forwards the request to interface device $NIU_B$ (line 176). In turn, $NIU_B$ forwards the request (line 178) to its corresponding $WAS_B$ for transmission (line 180) to the roaming mobile subscriber $PS_{A1}$. The roaming subscriber $PS_{A1}$ responds to the authentication request by transmitting an authentication response 182. $WAS_B$ forwards this response to its corresponding network interface unit $NIU_B$ (line 184). $NIU_B$ in turn forwards this response to circuitry $ATC_1$ (line 186) which forwards it to $NIU_{A1}$, $PS_{A1}$'s home network interface unit (line 188). If the authentication result is good, then $NIU_{A1}$ makes a set-up request to the PSTN 120 (line 190). A connect response 192 is received from PSTN 120 by the network interface device $NIU_{A1}$. The PSTN 120 makes necessary set-up in order to connect the message back. The connect message is then forwarded to circuitry $ATC_1$ (line 194) from $NIU_{A1}$. This response is forwarded from circuitry $ATC_1$ to interface device $NIU_B$ (line 196) and subsequently to $WAS_B$ (line 198) and on to subscriber $PS_{A1}$ (line 200). A communications connection 202 is then set up between subscriber $PS_{A1}$ and PSTN 120. The communications path includes subscriber PSA, $WAS_B$, $NIU_B$, circuitry $ATC_1$, $NIU_{A1}$, and PSTN 120. In tills way, a call path is established between a subscriber ($PS_{A1}$) and the public-switched telephone network (PSTN 120) by way of the subscriber's home interface device ($NIU_{A1}$). Alternatively, the same process may apply to call originating from a mobile subscriber through a private branch exchange switch.

Figure 6:
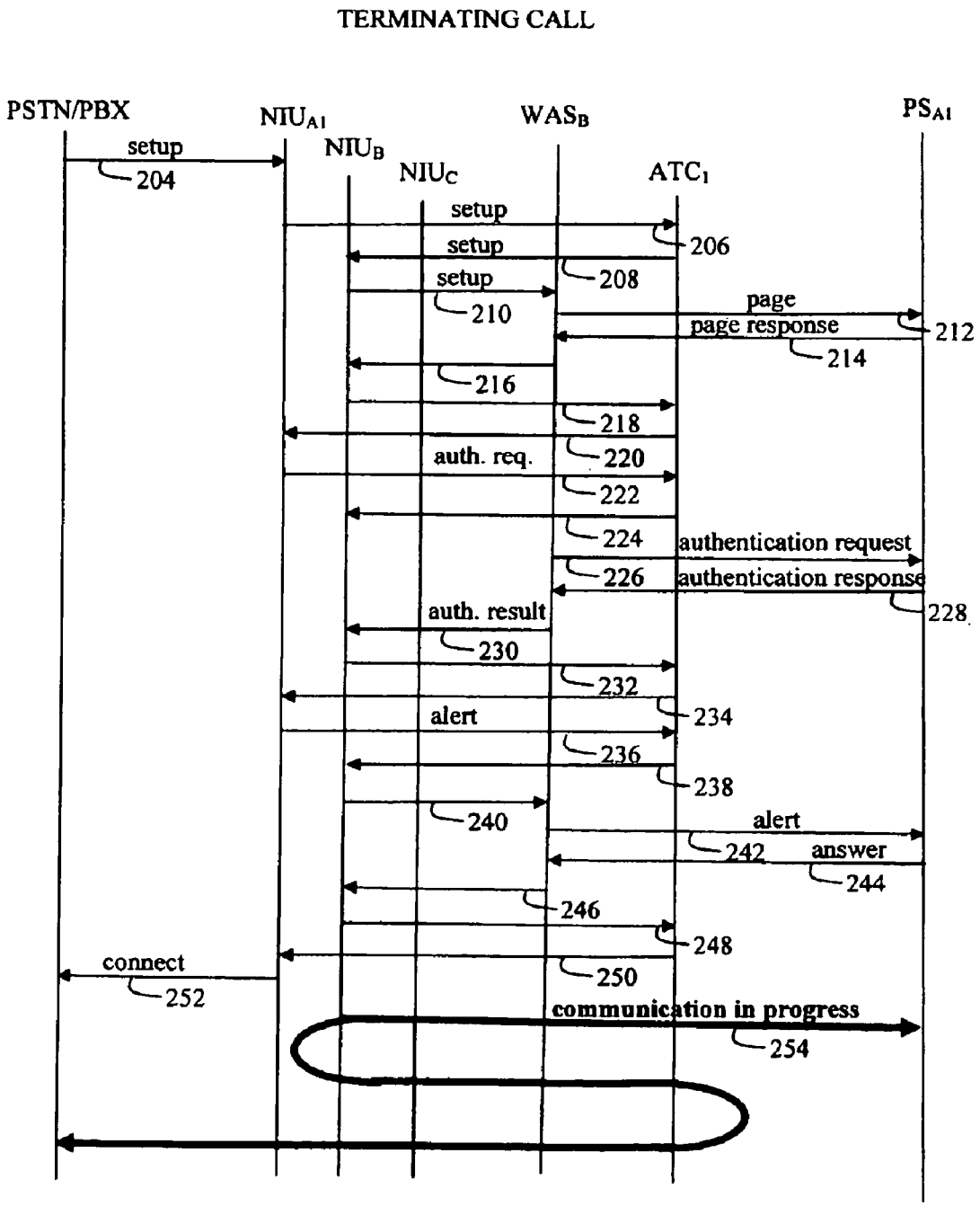
FIG. 6 is a connection diagram illustrating a mobile subscriber call termination process according to the present invention.

FIG. 6 is a connection diagram illustrating the mobile subscriber terminating call process according to the teachings of the present invention. Shown here is communication between entities: public switched to telephone network PSTN 120, interface device $NIU_{A1}$, network interface device $NIU_B$, network interface device $NIU_C$, wireless access sub-system, circuitry $ATC_1$, and subscriber $PS_{A1}$ Alternatively, the same process may apply if a PBX is an element of the communication loop rather than the PSTN. When a call originates from PSTN 120 (line 204), its set-up request is sent from PSTN 120 to interface device $NIU_{A1}$. This set-up request is made to the network interface device $NIU_{A1}$ because that network interface device is the home interface device for subscriber $PS_{A1}$. Interface device $NIU_{A1}$ sends a set-up request 206 to the ATC, via the $WAS_{A1}$ coupled to $NIU_{A1}$ (not shown here). This setup 206 is sent to ATC, because $ATC_1$ looks to $NIU_{A1}$ like another network interface controller comprising the $WAS_{A1}$ sub-system. Circuitry $ATC_1$ sends a set-up request 208 to interface device $NIU_B$ which forwards it to its corresponding wireless access subsystem $WAS_B$ (line 210). A page 212 is then made by $WAS_B$ to subscriber $PS_{A1}$. Subscriber $PS_{A1}$ responds to $WAS_B$ by a page response 214. The response is forwarded to the $NIU_B$ (line 216 and on to the circuitry $ATC_1$ (Line 218). Response is forwarded to the home network interface device $NIU_{A1}$ (Line 220) from $ATC_1$. $NIU_{A1}$ responds with an authorization authentication request 222 to circuitry $ATC_1$. Circuitry $ATC_1$ forwards the authentication request to interface device $NIU_B$ (Line 224), which forwards the request (Line 226) to $WAS_B$. $WAS_B$ forwards the request to subscriber $PS_{A1}$ (authentication request 226). Subscriber $PS_{A1}$ provides an authentication response 228 to $WAS_B$, which forwards the result 230 to $NIU_B$. The result is additionally forwarded to circuitry $ATC_1$ (Line 232), and along to interface device $NIU_{A1}$ (Line 234). The interface device $NIU_{A1}$ responds with an alert 236 to circuitry $ATC_1$. The alert is forwarded to the network interface unit located near the subscriber, interface $NIU_B$ (Line 238) and is additionally forwarded to $WAS_B$ (Line 240), and further to subscriber $PS_{A1}$ (alert 242). The alert causes the subscriber's device to ring, for example. The subscriber answers (Line 244). This answer is forwarded from $WAS_B$ on to $NIU_B$ (Line 246), then on to circuitry $ATC_1$ (Line 248), and further on to the $NIU_{A1}$ (Line 250). A connect message 252 is returned to the public switched network PSTN 120 (or alternatively a $PBX_{A1}$ not shown). The call 254 is then established between the PSTN 12b and subscriber $PS_{A1}$ via the subscriber's home network interface unit $NIU_{A1}$. The path includes PSTN 120, interface device $NIU_{A1}$, circuitry $ATC_1$, $NIU_B$, $WAS_B$ and subscriber $PS_{A1}$.

Figure 7:
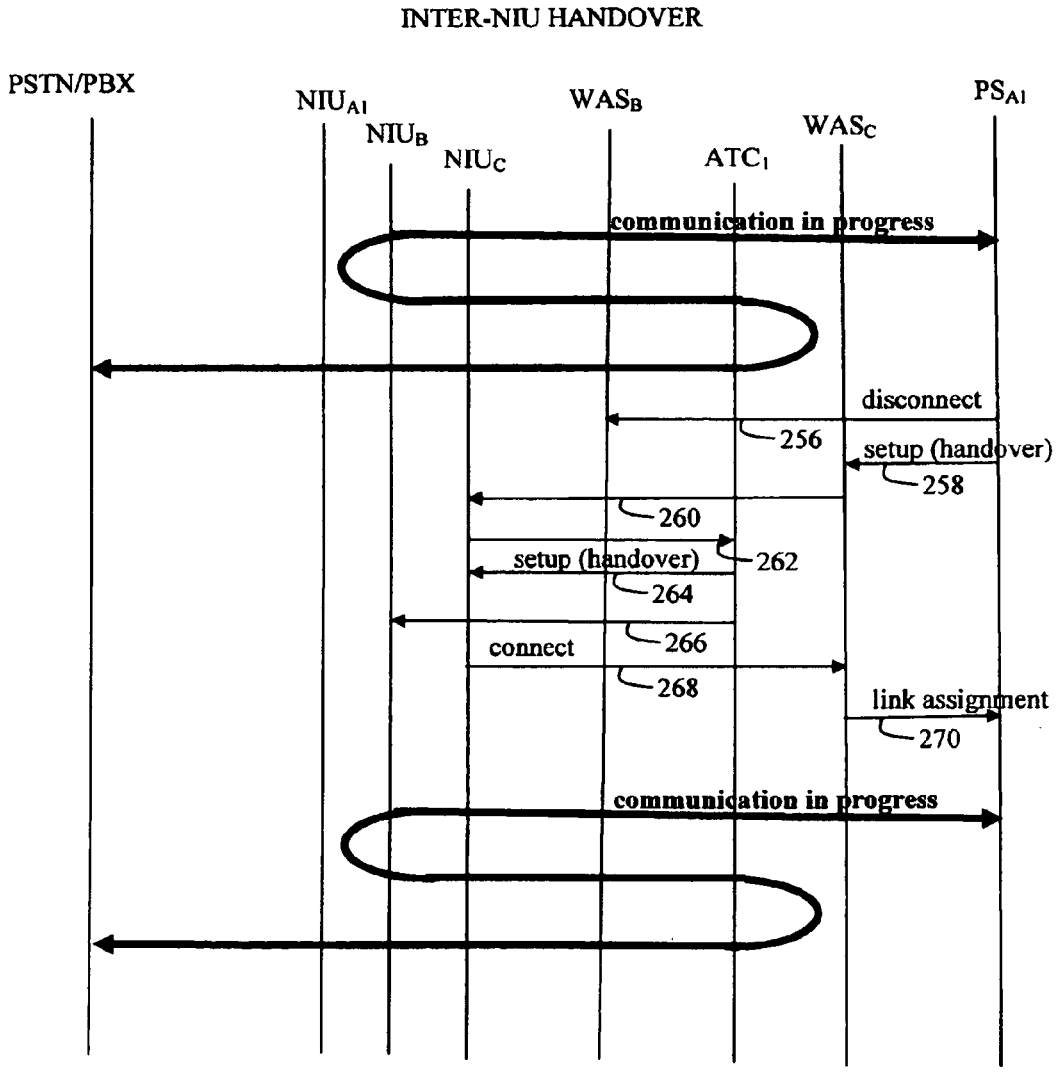
FIG. 7 is a block diagram illustrating an inter-NIU handover process according to the present invention.

FIG. 7 is a block diagram illustrating an inter-NIU handover process according to the teachings of the present invention. First, a connection is established between subscriber $PS_{A1}$ and PSTN 120 via subscriber's home network interface unit $NIU_{A1}$ and the network interface unit that serves the region in which the subscriber is currently located, $NIU_B$. Later the subscriber $PS_{A1}$ moves from the coverage area of interface device $NIU_B$ and into the coverage area of interface device $NIU_C$. A disconnect signal 256 is sent from subscriber $PS_{A1}$ to $WAS_B$, which is coupled to $NIU_B$. A set-up signal is also sent from subscriber PSA) to $WAS_C$, which serves the region in which the roaming subscriber is now located (set-up line (hand-over) 258). $WAS_C$ forwards this setup request to the local network interface unit $NIU_C$ (line 260). This request is then forwarded to circuitry $ATC_1$ (Line 262). A setup (handover) request is sent to the now local interface device $NIU_C$ (Line 264) from circuitry ATC). Now a release 266 can be sent from circuitry ATC) to the old local interface device $NIU_B$. A connect request 268 is then sent from the new network interface device $NIU_C$ to the $WAS_C$. The $WAS_C$ sends a link assignment signal 270 to the $PS_{A1}$. According to one embodiment, authentication is not performed at this point.

Figure 8:
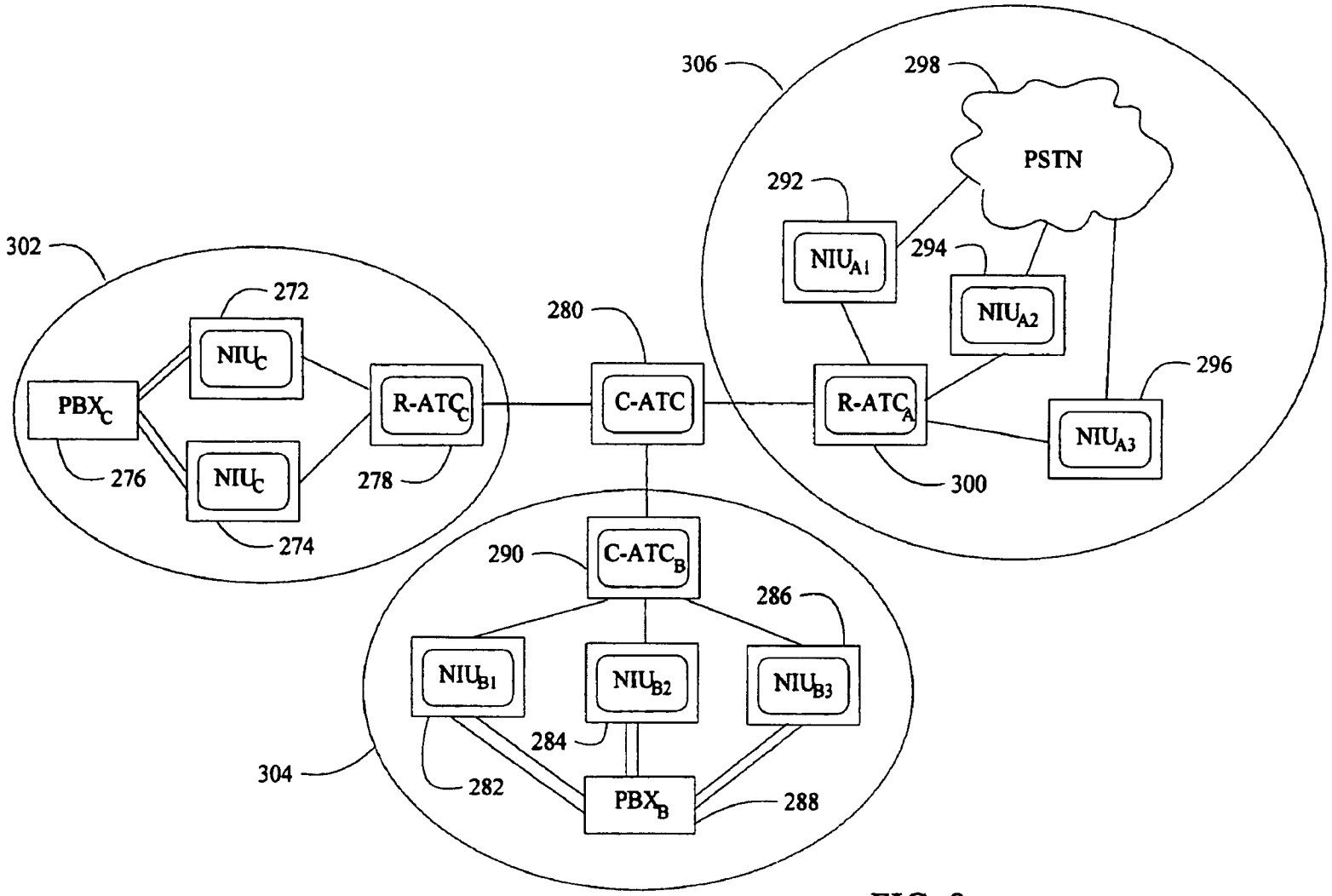
FIG. 8 is a block diagram of the hybrid public/private wireless network according to a second embodiment of the present invention illustrating how inter-network capacity can be almost independent from intra-network capacity.

FIG. 8 is a block diagram depicting a hybrid public/private wireless network according to another embodiment of the present invention. This illustrative example is used to demonstrate how inter-network capacity can be almost independent from intra-network capacity.

The ATC) function can be advantageously implemented in different ways depending on advance knowledge of such roaming traffic statistics. The sizing of the connectivity bandwidth between NIUs and ATCs is determined by the amount of roaming traffic between respective NIUs and the desired grade of service for such roaming traffic.

One particular example is the case where most roaming traffic occurs within distinct sub-networks of NIUs, with little roaming between such sub-networks and is illustrated in FIG. 8. In such a case, each the sub-network of NIUs can be connected with a Regional ATC (R-ATC) and the regional ATCs can be connected with a Central ATC (C-ATC). The bulk of roaming calls will be efficiently handled by the smaller R-ATC at the expense of an additional hop through the C-ATC for the fewer roaming calls that go across R-ATCs. The alternative non-hierarchical approach will require a larger capacity ATC for the whole network.

One specific example of this scenario is the case of a wireless network partitioned into a public wireless sub-network and a plurality of private wireless sub-networks, where each sub-network has its own dedicated or shared R-ATC. To simplify provisioning, rather than provision the C-ATC with the home R-ATC of each subscriber, each R-ATC is associated with a range of subscriber identifications (PSIDs) and all mobile subscribers for each sub-network are assigned a PSID exclusively from the range assigned to the R-ATC serving the sub-network. The physical realization of the ATC as a programmable digital cross-connect system puts an upper limit on the number of ATC connections available. Each sub-network having its own R-ATC therefore also permits easier capacity expansion of said sub-network without impacting the other sub-networks, contrary to what would be the case if all sub-networks were to share the same ATC and compete for the limited number of connections.

Where the coverage areas of different sub-networks overlap (as may commonly be expected between a public outdoor wireless sub-network and a private indoor wireless sub-network), the mobile subscriber chooses which sub-network to preferentially access, based on the PS's mode of operation and a code periodically emitted by the WAS of each sub-network. In one embodiment of the present invention, public subscribers are preprogrammed to preferentially access WAS that emit a predefined "public" code and private subscribers are preprogrammed to preferentially access WAS that emit a predefined "private" code as long as the signal quality from the preferentially selected WAS meets/exceeds certain minimum standards, even though the signal quality from the preferentially selected WAS may be inferior to the signal quality received from the other overlapping WAS which are not preferentially selected.

As shown in FIG. 8, a plurality of network interface units may be coupled together by a regional air traffic controller (R-ATC). For example, $NIU_{C1}$ 272 and $NIU_{C2}$ 274 are coupled to $PBX_C$ 276 and coupled through the $R\text{-}ATC_C$ 278 to each other and to a central ATC, C-ATC 280. Similarly, $NIU_{B1}$ 282, $NIU_{B2}$ 284 and $NIU_{B3}$ 286 are coupled to the $PBX_B$ 288 as well as being coupled through $R\text{-}ATC_B$ 290 to C-ATC 280. The network interface units $NIU_{A1}$ 292, $NIU_{A2}$ 294 and $NIU_{A3}$ 296 are coupled to a public-switched telephone network (PSTN) 298 and coupled to each other by $R\text{-}ATC_A$ 300, which in turn is coupled to C-ATC 280. In one embodiment, the various regional circuits 302, 304 and 306 may be located geographically close to each other. In another embodiment, the circuits may be coupled to interface devices that are likely to have traffic between them.

The foregoing examples illustrate certain exemplary embodiments of the invention from which other embodiments, variations, and modifications will be apparent to those skilled in the art. The invention should therefore not be limited to the particular embodiments discussed above.

We claim:

1. A communications system connecting mobile subscriber devices to at least one of a PSTN and PBX network comprising:

a plurality of network interface units (NIU) respectively communicatively coupled to one of a PSTN and a PBX having a predetermined coverage area;

at least one mobile subscriber device assigned to one of said network interface units designated a home network interface unit, said one mobile subscriber device receiving a port assignment through the home NIU from the PSTN or the PBX coupled thereto;

a plurality of wireless access subsystems (WAS) coupled respectively to the corresponding NIU and providing wireless connection between the corresponding NIU and a mobile subscriber device operating within the coverage area of the corresponding NIU; and a programmable cross-connect device (ATC) connecting the plurality of network interface units and dynamically cross connecting calls between the home network interface unit of a mobile subscriber device and another network interface unit the coverage area of which is visited by said mobile subscriber device, said dynamic cross-connection being accomplished as part of a call origination and termination process.

2. The system of claim 1 wherein said PSTN port assignment determines a directory number of the mobile subscriber device.

3. The system of claim 1 wherein said PBX network port assignment determines an extension number the mobile subscriber device.

4. The system of claim 1 wherein each NIU coupled to a PSTN is designated as a public NIU.

5. The system of claim 1 wherein each NIU coupled to one of the PBX networks is designated as a private NIU.

6. The system of claim 1 wherein each mobile subscriber may roam outside the coverage area of its home NIU and into the coverage area of a visited NIU.

7. The system of claim 6 wherein said ATC includes a visited location table entry and a home location table entry for said mobile subscriber.

8. The system of claim 7 wherein said ATC updates the visited location table entry in response to a registration message from said mobile subscriber device.

9. The system of claim 8 wherein said ATC connects a call path between the home NIU and the visited NIU, when said mobile subscriber device is roaming outside the coverage area of the home NIU and in the coverage area of the visited NIU.

10. The system of claim 9 wherein the call path includes incoming calls to said mobile subscriber device.

11. The system of claim 9 wherein the call path includes outgoing calls to said mobile subscriber device.

12. The system of claim 6 wherein the visited NIU directly connects an outgoing call from said mobile subscriber by dialing any of a predetermined set of dialed numbers to a corresponding substituted physical directory number without the call path going through said ATC.

13. The system of claim 12 wherein the home NIU is a private NIU.

14. The system of claim 13 wherein said mobile subscriber device dialing plan corresponding to a private home NIU determines a substituted physical device extension number for said mobile subscriber device, wherein said dialing plan is communicated to the visited network interface unit from the private home network interface unit.

15. The system of claim 12 wherein the home NIU is a public NIU.

16. The system of claim 15 wherein said mobile subscriber device dialing plan corresponding to a public home NIU determines the substituted physical directory number for said mobile subscriber device, wherein said dialing plan is communicated to the visited NIU from the public home NIU.

17. The system of claim 1 further comprising a plurality of ATCs.

18. The system of claim 17 further comprising at least one central programmable cross-connect device (C-ATC) connecting the plurality of ATCs.

19. The system of claim 18 wherein the C-ATC updates a corresponding visited location table entry in response to a registration message from said mobile subscriber device.

20. The system of claim 19 wherein each of the plurality of ATCs is the home ATC device for a predetermined range of mobile subscriber device identifications (PSID) corresponding to a plurality of mobile subscriber devices.

21. The system of claim 19 wherein all of the plurality of mobile subscribers assigned to a first home NIU under the coverage of a first home ATC have PSID assigned from a predetermined range.

22. The system of claim 18 wherein the C-ATC connects the call path between the visited ATC of said mobile subscriber device and the home ATC of said mobile subscriber device.

23. The system of claim 1 wherein each of the plurality of WASs emits a unique identification code (ID), said ID including certain coded attributes of the corresponding NIU.

24. The system of claim 23 wherein said ID identifies each WAS as one of a public WAS or a private WAS.

25. The system of claim 23 wherein said mobile subscribers determines preferential access to one of said plurality of NIUs based on the coded attributes of the ID.

26. The system of claim 25 wherein said public WAS is providing connection to the corresponding NIU coupled to the PSTN.

27. The system of claim 26 wherein said private WAS is providing connection to its corresponding NIU coupled to a PBX network.

28. The system of claim 1 wherein each NIU generates a call detail record recording call path information.

29. The system of claim 28 wherein a preferential billing rate is computed based on mobile subscriber identification number (PSID).

30. The system of claim 29 wherein the call detail record is searched for roaming PSIDs and a network usage bill may be presented to a public operator based on the call detail record.

31. A method of providing communication services for a plurality of mobile subscriber devices communicating via at least one of a PSTN and one of a plurality of PBX networks, comprising:

coupling a plurality of network interface units (NIU) to one of a PSTN and a PBX network, each of the plurality of network interface units having a corresponding predetermined coverage area;

assigning each of a plurality of mobile subscriber devices to only one of the plurality of network interface units designated as its home network interface unit, each of said mobile subscriber devices receiving a port assignment through its home NIU from the PSTN or the PBX coupled thereto;

coupling a wireless access unit (WAS) to each of the plurality of NIUs to provide wireless connection between each of said NIUs and a mobile subscriber device operating within the coverage area of said NIU; and using a programmable cross-connect device (ATC) to connect the plurality of NIUs and dynamically cross connecting calls between the home NIU of the mobile subscriber device and another NIU the coverage area of which is visited by said mobile subscriber device, said dynamic cross-connection being accomplished as part of a call origination and termination process.

32. The method of claim 31 wherein said PSTN port assignment determines a directory number for the mobile subscriber device.

33. The method of claim 31 wherein said PBX network port assignment determines an extension number for the mobile subscriber device.

34. The method of claim 31 wherein each NIU coupled to a PSTN is designated as a public NIU.

35. The method of claim 31 wherein each NIU coupled to one of the PBX networks is designated as a private NIU.

36. The method of claim 31 wherein each mobile subscriber may roam outside the coverage area of its home NIU and into the coverage area of a visited NIU.

37. The method of claim 36 wherein said ATC includes a visited location table entry and a home location table entry for said mobile subscriber.

38. The method of claim 37 wherein said ATC updates the visited location table entry in response to a registration message from said mobile subscriber device.

39. The method of claim 38 wherein said ATC connects a call path between the home NIU and the visited NIU, when said mobile subscriber device is roaming outside the coverage area of the home NIU and in the coverage area of the visited NIU.

40. The method of claim 39 wherein the call path includes incoming calls to said mobile subscriber device.

41. The method of claim 39 wherein the call path includes outgoing calls to said mobile subscriber device.

42. The method of claim 36 wherein the visited NIU directly connects an outgoing call from said mobile subscriber by dialing any of a predetermined set of dialed numbers to a corresponding substituted physical directory number without the call path going through said ATC.

43. The method of claim 42 wherein the home NIU is designated as a private NIU.

44. The method of claim 43 wherein said mobile subscriber device dialing plan corresponding to a private home NIU determines the substituted physical device extension number for said mobile subscriber device, wherein said dialing plan is communicated to the visited NIU from the private home NIU.

45. The method of claim 42 wherein the home NIU is designated as a public NIU.

46. The method of claim 45 wherein said mobile subscriber device dialing plan corresponding to a public home NIU determines the substituted physical directory number for said mobile subscriber device, wherein said dialing plan is communicated to the visited NIU from the public home NIU.

47. The method of claim 31 further comprising a plurality of ATCs.

48. The method of claim 47 further comprising at least one central programmable cross-connect device (C-ATC) connecting the plurality of ATCs.

49. The method of claim 48 wherein the C-ATC updates a corresponding visited location table entry in response to a registration message from said mobile subscriber device.

50. The method of claim 49 wherein each of the plurality of ATCs is the home ATC for a predetermined range of mobile subscriber devices identifications (PSID) corresponding to a plurality of mobile subscriber devices.

51. The method of claim 49 wherein all of the plurality of mobile subscribers assigned to a first home NIU under the coverage of a first home ATC have PSIDs assigned from a predetermined range.

52. The method of claim 48 wherein the C-ATC connects the call path between the visited ATC of said mobile subscriber device and the home ATC of said mobile subscriber device.

53. The method of claim 31 further comprising a plurality of WASs wherein each WAS emits a unique identification code (ID), said ID including certain coded attributes of a corresponding NIU.

54. The method of claim 53 wherein said mobile subscribers determines preferential access to one of said plurality of NIUs based on coded attributes of the ID.

55. The method of claim 53 wherein said ID identifies each WAS as one of a public WAS and a private WAS.

56. The method of claim 54 wherein said public WAS is providing connection to its corresponding NIU coupled to a PSTN.

57. The method of claim 54 wherein said private WAS is providing connection to its corresponding NIU coupled to a PBX network.

58. The method of claim 31 wherein each NIU generates a call detail record recording call path information.

59. The method of claim 58 wherein a preferential billing rate is computed based on PSIDs.

60. The method of claim 59 wherein the call detail record is searched for roaming PSIDs and a network usage bill may be presented to a public operator based on the call detail record.

61. A [computer program embodied in a] *tangible, non-transitory* computer readable medium [for providing communication services for a plurality of mobile subscriber devices communicating via at least one of a PSTN and one of a plurality of PBX networks,] *having instructions stored thereon, the instructions* comprising:

[code segment] *instructions* for coupling a plurality of network interface units (NIU) to one of a PSTN and a PBX network, each of the plurality of network interface units having a corresponding predetermined coverage area;

[code segment] *instructions* for assigning each of a plurality of mobile subscriber devices to only one of the plurality of network interface units designated as its home network interface unit, each of said mobile subscriber devices receiving a port assignment through its home NIU from the PSTN or the PBX coupled thereto;

*instructions for* coupling a wireless access unit (WAS) to each of the plurality of NIUs to provide wireless connection between each of said NIUs and a mobile subscriber device operating within the coverage area of said NIU; and

[code segment] *instructions* for using a programmable cross-connect device (ATC) to connect the plurality of NIUs and dynamically cross connecting calls between the home NIU of the mobile subscriber device and another NIU the coverage area of which is visited by said mobile subscriber device, said dynamic cross-connection being accomplished as part of a call origination and termination process.

62. The [computer program product] *tangible, non-transitory computer readable medium* of claim 61 wherein said PSTN port assignment determines a directory number for the mobile subscriber device.

63. The [computer program product] *tangible, non-transitory computer readable medium* of claim 61 wherein said PBX network port assignment determines an extension number for the mobile subscriber device.

64. The [computer program product] *tangible, non-transitory computer readable medium* of claim 61 wherein each NIU coupled to a PSTN is designated as a public NIU.

65. The [computer program product] *tangible, non-transitory computer readable medium* of claim 61 wherein each NIU coupled to one of the PBX networks is designated as a private NIU.

66. The [computer program product] *tangible, non-transitory computer readable medium* of claim 61 wherein each mobile subscriber may roam outside the coverage area of its home NIU and into the coverage area of a visited NIU.

67. The [computer program product] *tangible, non-transitory computer readable medium* of claim 66 wherein said ATC includes a visited location table entry and a home location table entry for said mobile subscriber.

68. The [computer program product] *tangible, non-transitory computer readable medium* of claim 67 wherein said ATC updates the visited location table entry in response to a registration message from said mobile subscriber device.

69. The [computer program product] *tangible, non-transitory computer readable medium* of claim 68 wherein said ATC connects a call path between the home NIU and the visited NIU, when said mobile subscriber device is roaming outside the coverage area of the home NIU and in the coverage area of the visited NIU.

70. The [computer program product] *tangible, non-transitory computer readable medium* of claim 69 wherein the call path includes incoming calls to said mobile subscriber device.

71. The [computer program product] *tangible, non-transitory computer readable medium* of claim 69 wherein the call path includes outgoing calls to said mobile subscriber device.

72. The [computer program product] *tangible, non-transitory computer readable medium* of claim 66 wherein the visited NIU directly connects an outgoing call from said mobile subscriber by dialing any of a predetermined set of dialed numbers to a corresponding substituted physical directory number without the call path going through said ATC.

73. The [computer program product] *tangible, non-transitory computer readable medium* of claim 72 wherein the home NIU is designated as a private NIU.

74. The [computer program product] *tangible, non-transitory computer readable medium* of claim 73 wherein said mobile subscriber device dialing plan corresponding to a private home NIU determines the substituted physical device extension number for said mobile subscriber device, wherein said dialing plan is communicated to the visited NIU from the private home NIU.

75. The [computer program product] *tangible, non-transitory computer readable medium* of claim 72 wherein the home NIU is designated as a public NIU.

76. The [computer program product] *tangible, non-transitory computer readable medium* of claim 75 wherein said mobile subscriber device dialing plan corresponding to a public home NIU determines the substituted physical directory number for said mobile subscriber device, wherein said dialing plan is communicated to the visited NIU from the public home NIU.

77. The [computer program product] *tangible, non-transitory computer readable medium* of claim 61 further comprising a plurality of ATCs.

78. The [computer program product] *tangible, non-transitory computer readable medium* of claim 77 further comprising at least one central programmable cross-connect device (C-ATC) connecting the plurality of ATCs.

79. The [computer program product] *tangible, non-transitory computer readable medium* of claim 78 wherein the C-ATC updates a corresponding visited location table entry in response to a registration message from said mobile subscriber device.

80. The [computer program product] *tangible, non-transitory computer readable medium* of claim 79 wherein each of the plurality of ATCs is the home ATC for a predetermined range of mobile subscriber devices identifications (PSID) corresponding to a plurality of mobile subscriber devices.

81. The [computer program product] *tangible, non-transitory computer readable medium* of claim 79 wherein all of the plurality of mobile subscribers assigned to a first home NIU under the coverage of a first home ATC have PSIDs assigned from a predetermined range.

82. The [computer program product] *tangible, non-transitory computer readable medium* of claim 78 wherein the C-ATC connects the call path between the visited ATC of said mobile subscriber device and the home ATC of said mobile subscriber device.

83. The [computer program product] *tangible, non-transitory computer readable medium* of claim 61 further comprising a plurality of WASs wherein each WAS emits a unique identification code (ID), said ID including certain coded attributes of a corresponding NIU.

84. The [computer program product] *tangible, non-transitory computer readable medium* of claim 83 wherein said mobile subscribers determines preferential access to one of said plurality of NIUs based on coded attributes of the ID.

85. The [computer program product] *tangible, non-transitory computer readable medium* of claim 83 wherein said ID identifies each WAS as one of a public WAS and a private WAS.

86. The [computer program product] *tangible, non-transitory computer readable medium* of claim 84 wherein said public WAS is providing connection to its corresponding NIU coupled to a PSTN.

87. The [computer program product] *tangible, non-transitory computer readable medium* of claim 84 wherein said private WAS is providing connection to its corresponding NIU coupled to a PBX network.

88. The [computer program product] *tangible, non-transitory computer readable medium* of claim 61 wherein each NIU generates a call detail record recording call path information.

89. The [computer program product] *tangible, non-transitory computer readable medium* of claim 88 wherein a preferential billing rate is computed based on PSIDs.

90. The [computer program product] *tangible, non-transitory computer readable medium* of claim 89 wherein the call detail record is searched for roaming PSIDs and a network usage bill may be presented to a public operator based on the call detail record.

91. A communications system connecting wireless subscriber devices to at least one of a PSTN network and a plurality of PBX networks comprising:

a plurality of network interface units coupled to one of a PSTN network and a PBX network, each of a plurality of network interface units having a predetermined coverage area;

a plurality of mobile subscriber devices, each of said mobile subscriber devices assigned to one of the plurality of network interface units corresponding to a home network interface unit of said mobile subscriber device;

a plurality of wireless access units, each of said plurality of wireless access units providing wireless connection between one of said plurality of network interface units and a plurality of subscriber devices within the coverage area of said one of said plurality network interface units; and a programmable cross connect device providing full connectivity between all constituent network interface units and dynamically cross connecting calls between the home network interface unit and the visited network interface unit as part of call origination and termination process.

92. The system of claim 91 wherein said mobile subscriber device receiving a port assignment from the corresponding PSTN network or PBX network coupled to said home network interface unit.

93. The system of claim 92 wherein said PSTN port assignment determining the mobile subscriber device directory number, and said PBX port assignment determining the mobile subscriber device extension number.

*94. A method comprising:*

*assigning one of a plurality of network interface units (NIUs) to a wireless subscriber as a home NIU of the wireless subscriber, wherein the plurality of NIUs are interconnected through an air traffic controller (ATC) circuit;*

*registering at the ATC a current location of the wireless subscriber in response to the wireless subscriber communicating with a visiting NIU different the home NIU; and*

*dynamically cross connecting calls to and from the roaming wireless subscriber, wherein the calls are established and conducted through the assigned home NIU of the roaming wireless subscriber, the ATC, and the visiting NIU of the roaming wireless subscriber;*

*wherein the home NIU is coupled to one of a Public Switched Telephone Network (PSTN) and a Private Branch Exchange (PBX) network,*

*wherein, if the home NIU is coupled to a PSTN, a PSTN port assignment determines a directory number of the wireless subscriber, and*

*wherein, if the home NIU is coupled to a PBX, a PBX port assignment determines an extension number of the wireless subscriber.*

*95. The method of claim 94, wherein each of the home NIU and visiting NIU is coupled to one of a Public Switched Telephone Network (PSTN) and a Private Branch Exchange (PBX) network.*

*96. The method of claim 94, wherein dynamically cross connecting calls comprises coupling the ATC with a second ATC.*

*97. The method of claim 94, further comprising the ATC updating the visited location table entry in response to a registration message from the wireless subscriber.*

*98. The method of claim 94, further comprising a plurality of wireless access subsystems (WASs) coupled to respective corresponding NIUs, at least one of the WASs providing wire-*

*less connectivity between the corresponding NIU and the wireless subscriber within the coverage area of the corresponding NIU.*

*99. The method of claim 94, wherein the ATC is configured to operate as a cross-connect switch between the plurality of NIUs and to store locations and details of the plurality of NIUs.*

*100. The method of claim 94, further comprising the ATC querying one or more NIUs other than the visiting NIU to determine the assigned home NIU.*

*101. A communication system comprising:*

*a plurality of network interface units (NIUs), wherein one of the plurality of NIUs is assigned to a wireless subscriber as a home NIU of the wireless subscriber; and*

*an air traffic controller (ATC) configured to register a current location of the wireless subscriber in response to the wireless subscriber communicating with a visiting NIU different from the home NIU, and dynamically cross connect calls to and from the roaming wireless subscriber, wherein the calls are established and conducted through the assigned home NIU of the roaming wireless subscriber, the ATC, and the visiting NIU of the roaming wireless subscriber;*

*wherein the home NIU is coupled to one of a Public Switched Telephone Network (PSTN) and a Private Branch Exchange (PBX) network,*

*wherein, if the home NIU is coupled to a PSTN, a PSTN port assignment determines a directory number of the wireless subscriber, and*

*wherein, if the home NIU is coupled to a PBX, a PBX port assignment determines an extension number of the wireless subscriber.*

*102. The communication system of claim 101, wherein each of the home NIU and visiting NIU is coupled to one of a Public Switched Telephone Network (PSTN) and a Private Branch Exchange (PBX) network.*

*103. The communication system of claim 101, wherein the ATC is further configured to communicate with a second ATC.*

*104. The communication system of claim 101, wherein the ATC is further configured to update a visited location table entry in response to a registration message from the wireless subscriber.*

*105. The communication system of claim 101, further comprising a plurality of wireless access subsystems (WASs) coupled to respective corresponding NIUs, wherein each WAS is configured to provide wireless connectivity between the corresponding NIU and the wireless subscriber when the wireless subscriber is within the coverage area of the corresponding NIU.*

*106. The communication system of claim 101, wherein the ATC is further configured to query one or more NIUs other than the visiting NIU to determine the assigned home NIU.*

*107. A communication system comprising:*

*a set of network interfaces providing communications services to respective geographic regions and each coupled to one of a Public Switched Telephone Network (PSTN) and a Private Branch Exchange (PBX) network; and*

*an air traffic controller (ATC) coupled to each of the network interfaces and configured to provide a communications link between the network interfaces and establish and conduct communication with a roaming mobile subscriber through a home network interface (NIU) to which the roaming mobile subscriber is assigned and a visiting network interface within whose respective geographic region the roaming mobile subscriber resides, to store locations and details of the plurality of NIUs;*

*wherein the home NIU is coupled to one of a Public Switched Telephone Network (PSTN) and a Private Branch Exchange (PBX) network,*

*wherein, if the home NIU is coupled to a PSTN, a PSTN port assignment determines a directory number of the wireless subscriber, and*

*wherein, if the home NIU is coupled to a PBX, a PBX port assignment determines an extension number of the wireless subscriber.*

*108. The communication system of claim 107, wherein the ATC is further configured to query one or more network interfaces other than the visiting network interface to determine the assigned home NIU.*

* * * * *